July 1, 1947. C. M. STONE ET AL 2,423,418
PROCESS FOR PRODUCING ALKADIENES BY DEHYDROGENATING ALKENES
Filed Aug. 14, 1943
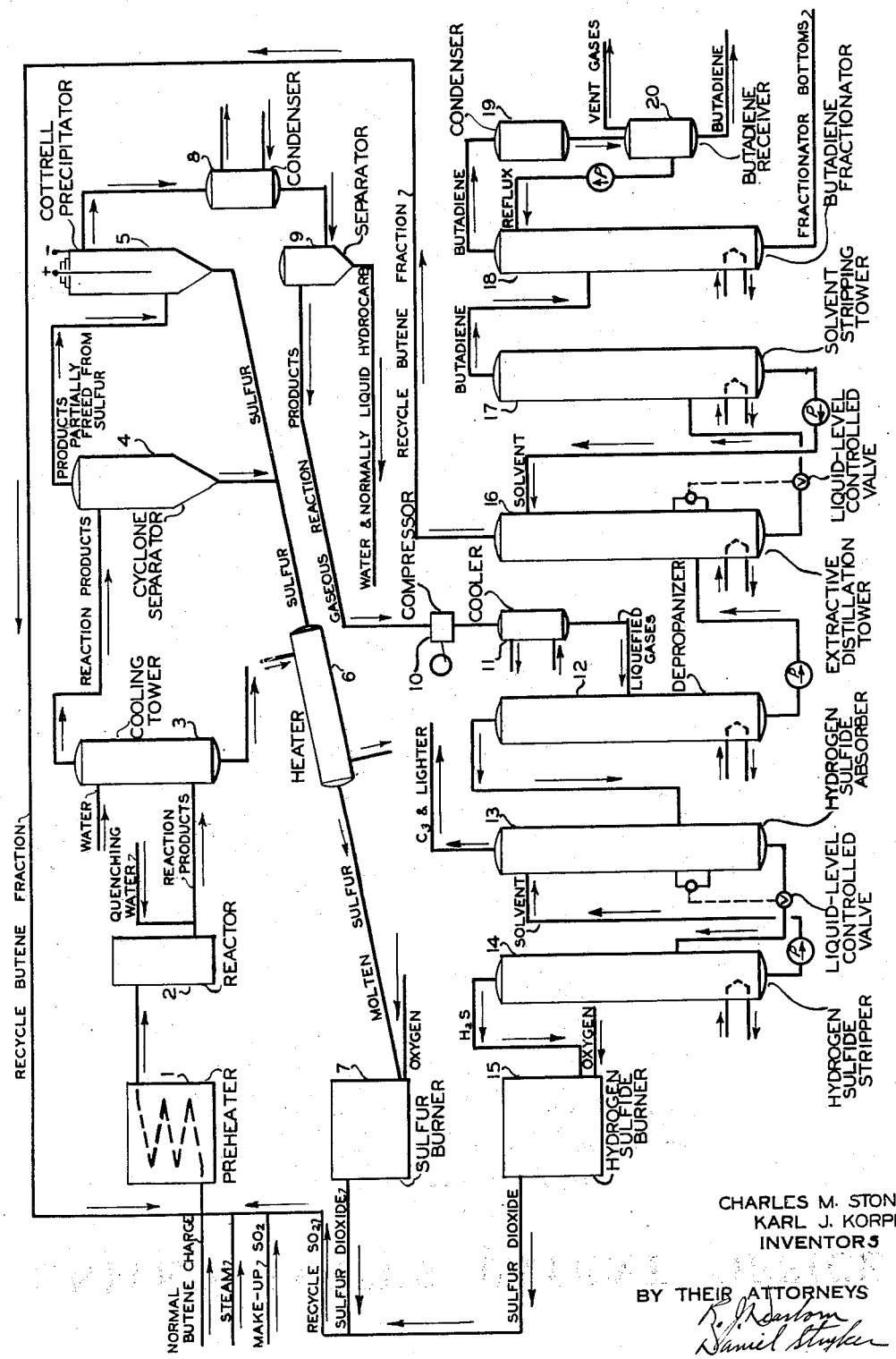
CHARLES M. STONE
KARL J. KORPI
INVENTORS
BY THEIR ATTORNEYS Patented July 1, 1947

2,423,418

UNITED STATES PATENT OFFICE 2,423,418

PROCESS FOR PRODUCING ALKADIENES BY DEHYDROGENATING ALKENES

Charles M. Stone, Beacon, N. Y., and Karl J. Korpi, Pasadena, Calif., assignors to The Texas Company, New York, N. Y., a corporation of Delaware Application August 14, 1943, Serial No. 498,738

3 Claims. (Cl. 260—680)

Our invention relates to the manufacture of dienes from unsaturated hydrocarbons, and particularly to an improved process for the manufacture of 1,3-butadiene and other conjugated alkadienes from normally gaseous olefins.

In the past, various processes have been proposed for the production of dienes from more saturated hydrocarbons by thermal or catalytic dehydrogenation. Such processes, however, have been characterized by low conversions, e. g., of the order of 2% to 10% per pass, and by low overall yields.

Attempts have been made to improve the conversions in certain dehydrogenation processes by the incorporation of an oxidizing agent or hydrogen acceptor in the hydrocarbon charge, and this expedient has been asserted to be beneficial in the dehydrogenation of paraffin hydrocarbons to olefins. Thus, U. S. Patent 2,126,817 of R. Rosen states that improved conversions of butane to butenes may be obtained by the incorporation of sulfur dioxide in the butane charge. However, under the more severe conditions employed for the dehydrogenation of olefins to dienes, a mixture of an olefin and sulfur dioxide may actually produce much less diene per pass, with a considerably lower over-all yield, than can be obtained under the same reaction conditions from a charge containing no reactance other than the olefin.

We have now discovered, however, that sulfur dioxide may be successfully employed as a hydrogen acceptor or secondary reactant in the dehydrogenation of olefins to dienes, if a combination of reaction conditions is chosen, as hereinafter described, which results in less severe dehydrogenation and cracking than take place under the conditions previously employed for the production of dienes from olefins. By using sulfur dioxide in a butene charge mixture under our improved reaction conditions, we have obtained single pass conversions to 1,3-butadiene considerably above 30%, with resulting concentrations of 1,3-butadiene in excess of 80 mol per cent of the $C_4$ cut of the reaction products.

Although it has been proposed that the dehydrogenation of paraffins to olefins in the presence of sulfur dioxide may be effected either thermally or with the aid of active dehydrogenation catalysts such as oxides of metals of group VI of the periodic system, we have found that neither of these methods is satisfactory for the dehydrogenation of olefins to dienes in the presence of sulfur dioxide. The high temperatures required for practical conversions in thermal operation result in excessive decomposition and low yields when sulfur dioxide is present. At lower temperatures, on the other hand, the same result is apparently brought about by the use of highly active dehydrogenation catalysts.

We have found that a catalyst is necessary for optimum dehydrogenation of olefins in the presence of sulfur dioxide; but such catalyst should have only moderate or negligible dehydrogenating activity in the absence of sulfur dioxide. Dehydrating catalysts, oxidizing catalysts, reforming catalysts, and other extensive surface hydrocarbon conversion catalysts which are not essentially dehydrogenating in activity may be used in our process. Among the various catalysts of this general class, we prefer to employ those comprising difficultly reducible oxides of the metals and metalloids of groups II to IV of the periodic system. Examples of our preferred catalysts are calcium oxide, magnesium oxide, alumina, and silica. The oxide catalysts may contain minor amounts of modifying agents or promoters, if desired, but such catalysts are preferably free from substantial amounts of metals of group VI of the periodic system. An example of a very satisfactory modified oxide catalyst comprises alumina impregnated with a minor amount of copper sulfate. Metal sulfates or silicates on other types of catalytic or inert supporting media may also be used.

It has been proposed that dehydrogenation reactions in the presence of hydrogen acceptors be carried out at relatively high pressures, since no appreciable volumetric change takes place during the reaction. Thus, Rosen recommended atmospheric and preferably super-atmospheric pressures for reaction mixtures consisting of paraffins and sulfur dioxide. We have found, however, that relatively low partial pressures of the reactants are required for optimum dehydrogenation of olefins to dienes when employing sulfur dioxide in the reaction mixture. The sum of the partial pressures of the reactants in our process should be substantially less than one atmosphere, and preferably of the order of one-half atmosphere. Partial pressures of the total reactants ranging from about 0.01 atm. to about 0.85 atm. will generally be satisfactory, but we prefer to maintain this pressure within the range 0.2 to 0.6 atm.

The reduced partial pressures of the reactants may be effected by employing a sub-atmospheric total pressure, or by incorporating a diluent in the reaction mixture. We generally prefer to use the latter procedure. Any diluent may be used which has no deleterious effect on the reactants or reaction products under the conditions employed for the reaction. Hydrogen or methane, or mixtures of these gases, may serve as diluents which tend to inhibit further oxidation of the dienes produced in the primary dehydrogenation reaction. Inert gases such as nitrogen or gaseous combustion products may be used, or the diluent may comprise a normally liquid compound, the vapors of which are stable and inert under the reaction conditions. Water is a very satisfactory diluent which may be charged separately as steam, or may be introduced in the form of water of hydration of either of the reactants. Thus, the olefin may be introduced as the corresponding alcohol, sulfur dioxide may be introduced in the form of sulfurous acid, or both may be introduced in the form of an ester. The following are representative charge stocks including water as the diluent:

*Charge of separate constituents*

$ROH + H_2SO_3$
$ROH + SO_2 + H_2O$
$R'CH=CHR'' + H_2SO_3$
$R'CH=CHR'' + SO_2 + H_2O$

*Ester charge stocks*

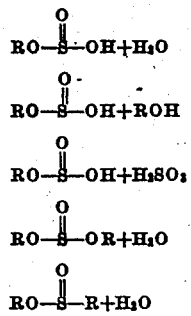

If water is introduced in the form of sulfurous acid, such acid may provide all or only a part of the sulfur dioxide, depending upon the amount of diluent desired in the reaction mixture. Usually, however, we prefer to employ a lower ratio of diluent to sulfur dioxide than that of sulfurous acid at ordinary temperatures and pressures. Separately charging olefin, sulfur dioxide, and diluent offers the most flexibility of operation and we generally prefer this procedure.

The relative proportions of the reactants and diluents may vary over a comparatively wide range. Usually, however, mol ratios of sulfur dioxide to olefin ranging from 0.1/1.0 to 5.0/1 will be most satisfactory, and we generally prefer to use ratios of 0.25/1 to 1/1. The mol ratio of diluent to olefin may suitably range from 1/1 to 10/1, but is preferably 2/1 to 5/1.

As has previously been indicated, the time-temperature conditions for the reaction should be chosen to minimize decomposition reactions, and the least severe conditions giving practical conversions to dienes are to be preferred. The temperature is preferably substantially below that required for thermal dehydrogenation in the absence of sulfur dioxide. Temperatures of 800 to 1300° F. will generally be satisfactory, and in most cases we prefer to use temperatures of 900 to 1200° F. The higher temperatures, e. g., 1200 to 1300° F., are best adapted for charge stocks containing sulfurous esters. Temperatures of the order of 900 to 1100° F. appear to be most satisfactory for separately charging an olefin, sulfur dioxide, and water.

The contact time for the reaction is relatively short, but the optimum value will vary to some extent, depending upon the other reaction conditions. Contact times of 0.1 to 2.0 seconds will generally be satisfactory, and we prefer in most cases to use contact times of 0.2 to 0.5 second. Within these ranges the shorter contact times are preferably employed at high reaction temperatures, and the longer contact times at low reaction temperatures.

The reaction vessel may be of any of the types used for high temperature gas reactions, such as those employed for cracking or dehydrogenating petroleum hydrocarbons. Cracking reactors designed for contacting the charge gas with hot combustion gases may be used, in which case the hot combustion gases will not only provide the heat for the process but will also serve as diluents. Cracking reactors of the pipe furnace type may be used, or preheaters of this type may be employed in conjunction with a larger reaction vessel. The reaction vessel is preferably filled with a catalyst of the class previously described. A packing material of extensive surface, such as raschig rings, or the like, may be impregnated with a suitable catalyst, or the entire packing may be made up of the catalytic material. If desired, the first portion of the reaction vessel may serve as the preheater, in which case it may suitably be filled with inert packing rather than with catalyst. When employing normally liquid charge stocks, such as sulfurous acid or esters, it is often advantageous to spray the liquid into a flash vaporizer or combined vaporizer and preheater. Prolonged heating in the liquid state is usually disadvantageous from the standpoint of increased corrosion and coke formation.

The usual operating expedients for high temperature reactions and for diene production may be employed when using our charge mixtures. For example, it is desirable to quench the reaction products immediately on leaving the reaction zone in order to minimize decomposition of the dienes produced. The recovery of the dienes and unreacted charged hydrocarbons from the reacted mixture may also be effected in accordance with prior practices in similar processes. Such recovery systems, however, are preferably modified as described below, to enable sulfur and hydrogen sulfide to be recovered and reoxidized for recycling.

One modification of our preferred process, adapted for cyclic operation with a butene-sulfur dioxide-steam reaction mixture, is illustrated diagrammatically in the accompanying drawing. Referring to this drawing, the butene, sulfur dioxide, and steam are charged to a tube furnace preheater 1 and then to a reactor 2, which may suitably be a stainless steel vessel packed with alumina or other oxide catalyst of the class discussed above. The reaction products are preferably quenched by injection of water immediately on leaving the reactor 2, and are then cooled further by the introduction of additional water in the cooling tower 3. Any high boiling tarry reaction product may be removed from the bottom of the cooling tower 3, but the temperature is preferably maintained sufficiently high to prevent condensation of low boiling hydrocarbons. If the temperature is sufficiently low to permit partial condensation of water in the tower 3, a substantial amount of sufur may be removed from the reaction products in this tower in the form of a sulfur suspension in water, or in a water-tar emulsion, from which the sulfur can be recovered by flocculation or centrifuging. This method of operation tends to minimize plugging of the liquid draw-off line by tar or plugging of the gas lines by sulfur.

The cooled gas mixture, containing suspended sulfur, passes from the cooling tower 3 to a cyclone separator 4, and then to a Cottrell precipitator 5. The larger sulfur particles are removed by the cyclone separator and the remainder by the electrical precipitator. The sulfur thus recovered is suitably melted by the heater 6, and the molten sulfur may then be burned in a conventional sulfur burner 7 to produce sulfur dioxide for recycling to the charge.

The reaction products, after being freed from sulfur in the Cottrell precipitator 5, pass to a condenser 8, and then to a conventional liquid-gas separator 9, for the removal of residual water and any normally liquid reaction products which were not removed in cooling tower 3. The gas mixture leaving the separator 9 is then liquefied by means of compressor 10 and cooler 11, in order to effect further separation of its components by distillation.

The liquefied gaseous reaction products are first distilled in the depropanizer 12, where hydrogen sulfide, propane, and lighter hydrocarbons are taken overhead. The hydrogen sulfide in this gas mixture may then be recovered by conventional absorption in an amine solution or other absorbent for weakly acid gases, employing the usual absorption tower 13 and stripping tower 14. The overhead from the absorber 13 comprises propane and lighter hydrocarbons, and substantially pure hydrogen sulfide is obtained as overhead from the stripper 14. This hydrogen sulfide may then be burned in a conventional burner 15 to obtain sulfur dioxide for recycle to the charge.

If oxygen is used for burning the sulfur and hydrogen sulfide in burners 7 and 15, substantially pure sulfur dioxide may be obtained for recycle. However, air may be used, in which case the nitrogen content of the resulting combustion product will serve as a diluent in charge mixtures containing the recycled sulfur dioxide.

The bottoms from the depropanizer 12, comprising essentially $C_4$ hydrocarbons, may then be further treated by any of the known methods for the separation of butadiene and the recovery of unreacted butene for recycle. In the modification illustrated in the drawing, the $C_4$ fraction is subjected to extractive distillation in tower 16, using a selective solvent such as furfural to extract the butadiene while distilling the more saturated compounds overhead. This overhead fraction from the extractive distillation tower 16 comprises largely unreacted butene. The butene content may be separated for recycling, or the entire fraction may be recycled to the charge as shown in the drawing.

The butadiene solution taken from the bottom of the extractive distillation tower 16 passes to a conventional stripping tower 17, where butadiene is taken overhead and the solvent is recovered for recycle to the tower 16. The butadiene fraction recovered as overhead from the solvent stripping tower 17 may then be further purified by any suitable procedure, such as by distillation in the fractionating tower 18 shown in the drawing.

It is to be understood that numerous equivalents may be employed in place of the particular units discussed above with reference to the drawing. It should also be understood that this drawing is merely diagrammatic, and that many elements such as valves and heat exchangers have been omitted for the sake of simplicity.

Our process is applicable to the production of dienes from any unsaturated hydrocarbons, and the usual types of charge stocks employed for diene production in prior thermal or catalytic processes are suitable for use in conjunction with sulfur dioxide. The normally gaseous olefins are very satisfactory charge stocks for our process, and even the lower molecular weight olefins, such as ethylene, may be transformed to butadiene by this method. We prefer, however, to employ unsaturated hydrocarbons which may be directly dehydrogenated to alkadienes without the necessity of cracking reactions or intermolecular reactions. The straight chain olefins of 4 or 5 carbon atoms are especially suited for use in the present process, and we prefer to use the normal butenes. Our process will be further illustrated by the following specific examples:

*Example I*

Butene-2, sulfur dioxide, and steam were separately charged to a stainless steel reaction vessel containing a packing of magnesium oxide. The first portion of the vessel served as a preheater, and the remainder as the reactor proper. The average maximum reactor temperature during the run was about 1080° F. The charge rates corresponded to a mol ratio $C_4H_8/SO_2/H_2O$ of 1.00/1.1/4.2, and the contact time was approximately 0.33 second (on the basis of free space in the reaction zone and total volume of butene, sulfur dioxide, and water at the average maximum reactor temperature, calculated in accordance with the ideal gas laws). The yield of butadiene obtained in single pass operation was 23.2% by weight, based on the weight of the butene-2 charged, or approximately 24% of the theoretical yield. On the basis of recovered butene fraction for recycling, this corresponded to a total yield for cyclic operation of about 38% of the theoretical yield.

*Example II*

A stainless steel reaction vessel packed with aluminum oxide was employed for the pyrolysis of a mixture of butene-2, sulfur dioxide and steam, separately charged to the reactor. The first portion of the reaction vessel was utilized as a preheater, and the remainder of the vessel served as the reactor proper. The charge rates corresponded to a mol ratio $C_4H_8/SO_2/H_2O$ of about 1.0/0.6/3.5. The average maximum reactor temperature during the run was about 1100° F. and the contact time in the reaction zone was approximately 0.38 second (based on the total space of the reaction zone and the total volume of butene, sulfur dioxide, and water, at the average maximum reaction temperature, calculated in accordance with the ideal gas laws). In single pass operation, the yield of butadiene was 34.2% of the theoretical. The recovery of unreacted butene fraction for recycling was 31.6% of the original charge, indicating an over-all yield of butadiene in cyclic operation of 50% of the theoretical yield.

*Example III*

The procedure of Example II was followed, using a catalyst comprising 5 parts by weight of cupric sulfate adsorbed on 95 parts by weight of alumina. The charge rates corresponded to a mol ratio $C_4H_8/SO_2/H_2O$ of about 1.0/1.0/4.3 and the average maximum reaction temperature during the run was about 1115° F. The contact time was approximately 0.34 second, calculated as in Example II. The yield of butadiene in single pass operation was approximately 36.2% of the theoretical yield, and the butadiene content of the C₄ cut of the products was approximately 86.3 mol per cent.

*Example IV*

The procedure of Example II was followed, using a fresh aluminum oxide catalyst. The charge rates corresponded to a mol ratio $C_4H_8/SO_2/H_2O$ of about 1.0/0.24/3.9 and the maximum reaction temperature during the run was 1095 to 1100° F. The contact time was approximately 0.34 second, calculated as in Example II. Product samples were taken at relatively short intervals during the early part of the run and where analyzed for butadiene and unreacted butene-2. The single pass yields and ultimate yields for cyclic operation indicated by these analyses are shown in the table below:

| Time from Start of Run, minutes | Single Pass Yield of Butadiene, per cent of theoretical | Butene-2 Recovered, per cent of charge | Ultimate Yield of Butadiene, per cent of theoretical |
| --- | --- | --- | --- |
| 5–20 | 13.5 | 55.7 | 30.4 |
| 20–40 | 19.2 | 60.2 | 48.2 |
| 40–60 | 22.5 | 61.6 | 58.6 |
| 60–80 | 24.0 | 62.8 | 64.5 |

As may be seen from the above table, the relatively inactive catalysts which are employed in our process undergo an initial conditioning period, or activating period, before the maximum conversions are obtained.

It is to be understood, of course, that the above examples are merely illustrative and do not limit the scope of our invention. Other charge hydrocarbons and other diluents may be substituted for the particular materials used in these examples, and the operating conditions may also be modified in accordance with the foregoing description. In general, it may be said that the use of any equivalents or modifications of procedure which would naturally occur to those skilled in the art is included in the scope of our invention. Only such limitations should be imposed on the scope of this invention as are indicated in the appended claims.

We claim:

1. A process for the production of 1-3 butadiene from a normal butene which comprises passing into a reaction zone maintained at temperatures in the range of 900 to 1200° F. and in contact with a catalyst consisting of aluminum oxide and a minor proportion of absorbed cupric sulfate, with a contact time of 0.1–2.0 seconds, a gaseous mixture of a normal butene, $SO_2$ and steam in which the sum of the partial pressures of butene and $SO_2$ is substantially below 0.85 atmosphere, and comprising 0.25–1.0 mol of $SO_2$ and at least one mol of steam per mol of butene.

2. A process for the production of alkadienes from alkenes which comprises passing into a reaction zone, maintained at temperatures of at least 800° F., and in contact with an aluminum oxide catalyst containing a minor proportion of adsorbed copper sulfate, a gaseous mixture of an alkene, $SO_2$ and steam in which the sum of the partial pressures of alkene and $SO_2$ is substantially below one atmosphere, and comprising at least 0.1 mol of sulfur dioxide and one mol of steam per mol of alkene.

3. A process for the production of alkadienes from alkenes which comprises passing into a reaction zone, maintained at temperatures in the range of 800 to 1300° F., and in contact with an alumina catalyst impregnated with a minor proportion of copper sulfate, a gaseous mixture of an alkene, $SO_2$ and steam in which the sum of the partial pressures of alkene and $SO_2$ is substantially below 0.85 atmosphere, and comprising 0.25–1.0 mol of $SO_2$ and at least one mol of steam per mol of alkene.

CHARLES M. STONE.
KARL J. KORPI.

REFERENCES CITED

The following references are of record in the file of this patent:

UNITED STATES PATENTS

| Number | Name | Date |
| --- | --- | --- |
| 2,197,872 | Monroe et al. | Apr. 23, 1940 |
| 2,269,028 | Liedholm et al. | Jan. 6, 1942 |
| 2,126,817 | Rosen | Aug. 16, 1938 |
| 2,367,620 | Schulze et al. | Jan. 16, 1945 |
| 2,370,513 | Amos et al. | Feb. 27, 1945 |
| 2,370,512 | Amos et al. | Feb. 27, 1945 |
| 2,126,817 | Rosen | Aug. 16, 1938 |
| 1,997,967 | Gibbons et al. | Apr. 16, 1935 |
| 2,092,386 | Baehr et al. | Sept. 7, 1937 |